Nov. 1, 1932.  H. A. FLOGAUS  1,885,815
ENGINE SUPPORT
Filed April 23, 1930
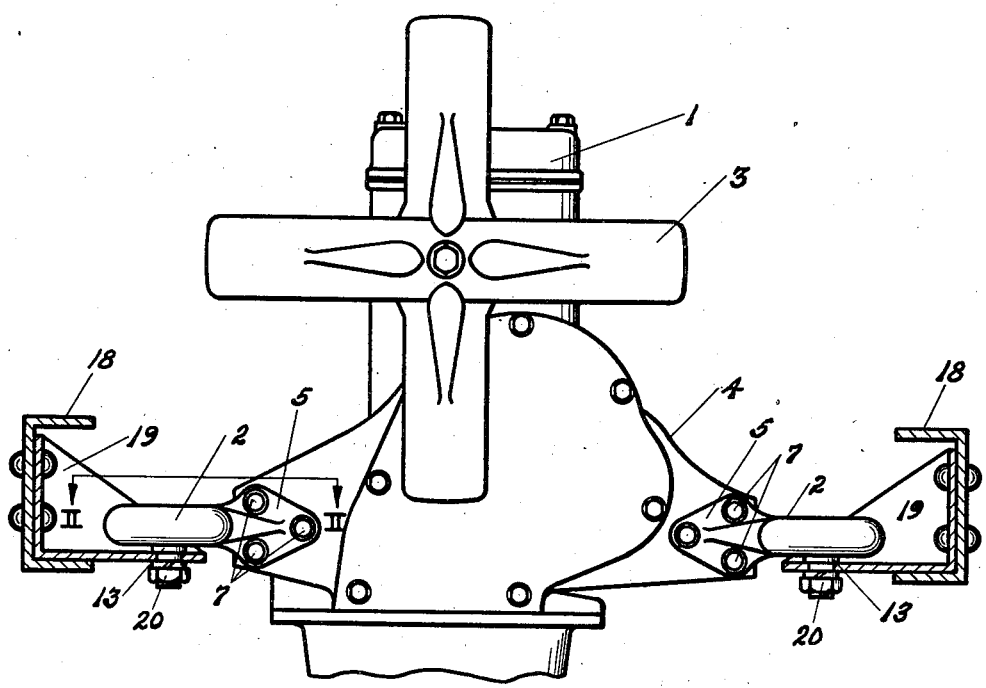
Fig. I.
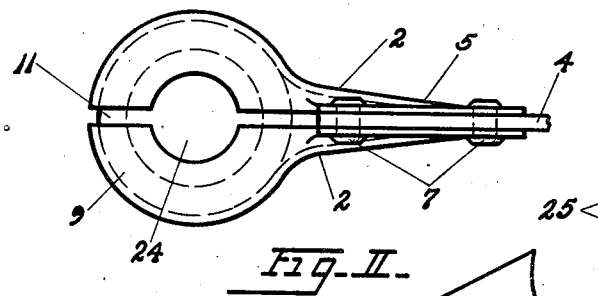
Fig. II.
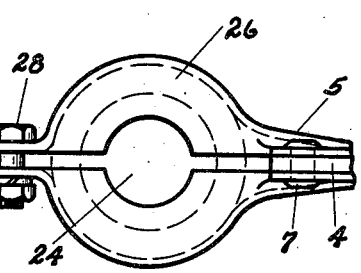
Fig. IV.
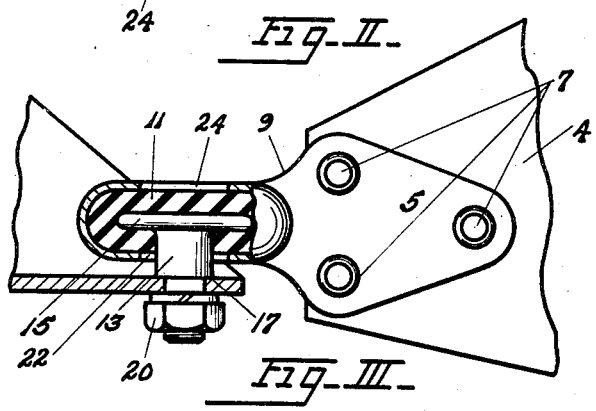
Fig. III.
INVENTOR.
HOWARD A. FLOGAUS
BY Warren P. Hunt
ATTORNEY.

Patented Nov. 1, 1932

1,885,815

UNITED STATES PATENT OFFICE

HOWARD A. FLOGAUS, OF TOLEDO, OHIO, ASSIGNOR TO THE WILLYS-OVERLAND COMPANY, OF TOLEDO, OHIO, A CORPORATION OF OHIO

ENGINE SUPPORT

Application filed April 23, 1930. Serial No. 446,567.

This invention relates to engine supports, and more particularly to supports of the resilient type.

One of the objects of the invention is to provide an engine support that will facilitate the installation of the engine into the vehicle frame.

Another object is to provide a support in which the brackets may be formed of stampings.

Another object of the invention is to provide a support in which the brackets may be made in two identical stamped halves.

Another object of the invention is to provide a bracket which is particularly adapted to engines having sheet metal supporting plates.

These and other objects will appear from the description to follow, in connection with which I have shown certain embodiments in the accompanying drawing, in which:

Figure I is a front elevation, partly in section, of a motor supported in a vehicle frame.

Fig. II is a plan view of the support member in the direction of lines II—II of Figure I.

Fig. III is a slightly enlarged view, partly in section, of the support.

Fig. IV is a plan view in a modified form of the support.

Referring to the drawing, 1 is an engine provided with the usual cooling fan 3 and having a vertical sheet metal supporting plate 4. Each engine support comprises two identical brackets 2 having extensions 5 which are secured to opposite sides of the plate by means of rivets 7, or other suitable means.

The outer ends of the brackets 2 are formed with cup-shaped depressions 9 of U-cross section, which closely engage a mass of resilient material 11, such as rubber which is preferably bonded to the stud 13 and surrounds the head 15. The resilient member 11 is approximately the size and form of the cup-shaped depressions 9 and is tightly clamped within the bracket depressions in their assembled position. Stud 13 is provided with a shoulder 17 that engages the top side of frame bracket 19 and permits nut 20, which is threaded upon the lower portion of the stud to tightly clamp the stud upon the frame bracket 19 without deforming the rubber member 11 or interfering with slight movement of the brackets.

I prefer to form each bracket 2 with two semi-circular superposed openings of slightly larger diameter than the shank of the stud 13 so that the two identical bracket members may be assembled with their depressions facing one another, and form a support having an opening 22 surrounding the shank portion of the stud 13. A similar opening 24 is formed above the head portion 15 but this opening is not objectionable and is necessary if the two halves are identical. Openings 22 are preferably of larger diameter than the shank of stud 13 to permit the brackets 2 to have slight relative movement with respect to the stud 13 and are smaller than the head 15 to provide against the stud being torn free from the support.

In assembling my improved support to the engine I prefer to first form the resilient material about the stud 13 and to then insert the stud and rubber assembly into the complementary cup-shaped depressions 9 in the brackets 2. The assembled support is then secured to the engine plate 4 by clamping the two extensions 5 upon opposite sides of the plate and securing them in position by means of the rivets 7. The engine, with the supports, may then be lowered vertically into engagement with the frame brackets 19 which are secured to the frame member 18, and the engine clamped into position by means of nuts 20. It will be noted that my improved support permits a slight relative movement in any direction between the engine and the frame and that the supports may be assembled and attached to the engine prior to its installation in the frame.

The modified form of the bracket shown in Fig. IV, in its essentials, is substantially the same as the preferred form, except for the addition of projecting ears 25 that are formed integrally with the complementary bracket halves 26, and which are clamped together by means of the bolt 28 that passes through suitable holes provided in the ears 25.

While I have illustrated and described certain embodiments of my invention, it is to be understood that I do not regard my invention as limited to the constructions shown and described, and I, therefore, desire to claim the invention broadly, except insofar as I have included such limitations within the terms of the following claims.

I claim:

1. A motor support for an engine comprising a stud, a mass of resilient material secured to a portion of the stud, a pair of bracket members having complementary cup-shaped depressions partially embracing the resilient material, and said bracket members having integrally formed substantially parallel extensions thereon for attaching the bracket to the engine.

2. A support for an engine comprising a stud having a head, a mass of resilient material secured to the head and surrounding the same, a pair of complementary bracket members having cup-shaped depressions embracing the resilient material, the adjacent edges of the depressions of said brackets being spaced apart, and said bracket members having extensions thereon adapted to be secured together and clamp the members around the resilient material and means independent of said extensions for adjustably securing said bracket members together.

In testimony whereof, I affix my signature.

HOWARD A. FLOGAUS.